A. C. THÉRIAULT.
INCUBATOR.
APPLICATION FILED AUG. 21, 1920.

1,415,732.

Patented May 9, 1922.

Inventor
A.C. Thériault

A. C. THÉRIAULT.
INCUBATOR.
APPLICATION FILED AUG. 21, 1920.

1,415,732.

Patented May 9, 1922.
2 SHEETS—SHEET 2.

Inventor
A.C.Thériault

By
Attorney

UNITED STATES PATENT OFFICE.

ALPHONSE CLÉOPHAS THÉRIAULT, OF MONTREAL, QUEBEC, CANADA.

INCUBATOR.

1,415,732.         Specification of Letters Patent.         Patented May 9, 1922.

Application filed August 21, 1920.   Serial No. 405,145.

*To all whom it may concern:*

Be it known that I, ALPHONSE CLÉOPHAS THÉRIAULT, a British subject, residing at #1818 Iberville Street, in the city of Montreal, of the Province of Quebec, in the Dominion of Canada, have invented certain new and useful Improvements in Incubators; and I do hereby declare that the following is a full, clear, and exact description of the same.

The present invention relates to incubators, and the main object of the invention is to provide a device of the character indicated, in which all the eggs may be instantaneously and simultaneously reversed or turned without having to open the incubator.

Another object of this invention, is to provide a tilting egg carrying device that can be manually operated at will to variable extents and in either direction.

A further object of this invention is to provide an incubator that will be particularly cheap and simple of construction.

To better understand the invention reference should be had to the accompanying drawings in which:—

Like numerals of reference indicate corresponding parts in each figure.

Figure 1:
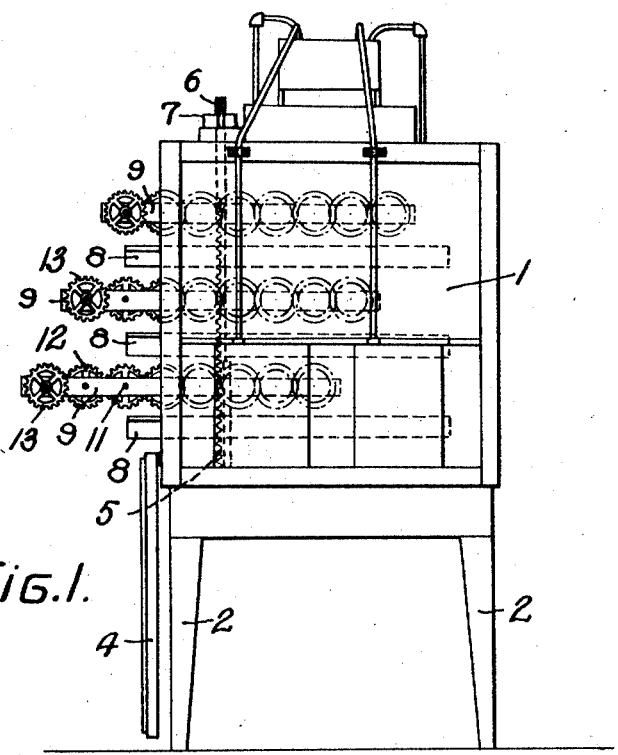
Figure 1 is a side elevation of an incubator according to the invention.
Figure 2:
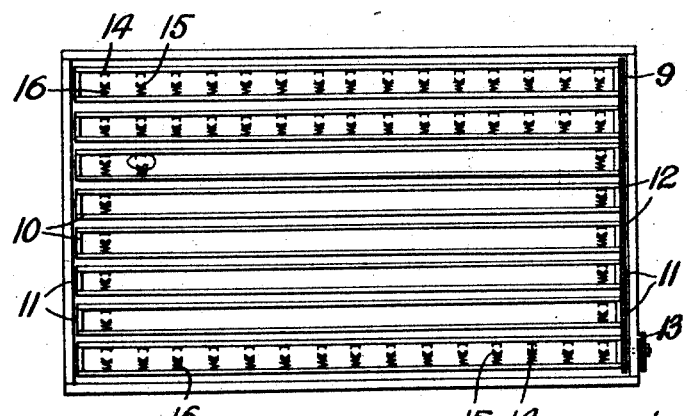
Figure 2 is a top view of one of the egg supporting frames.
Figure 3:
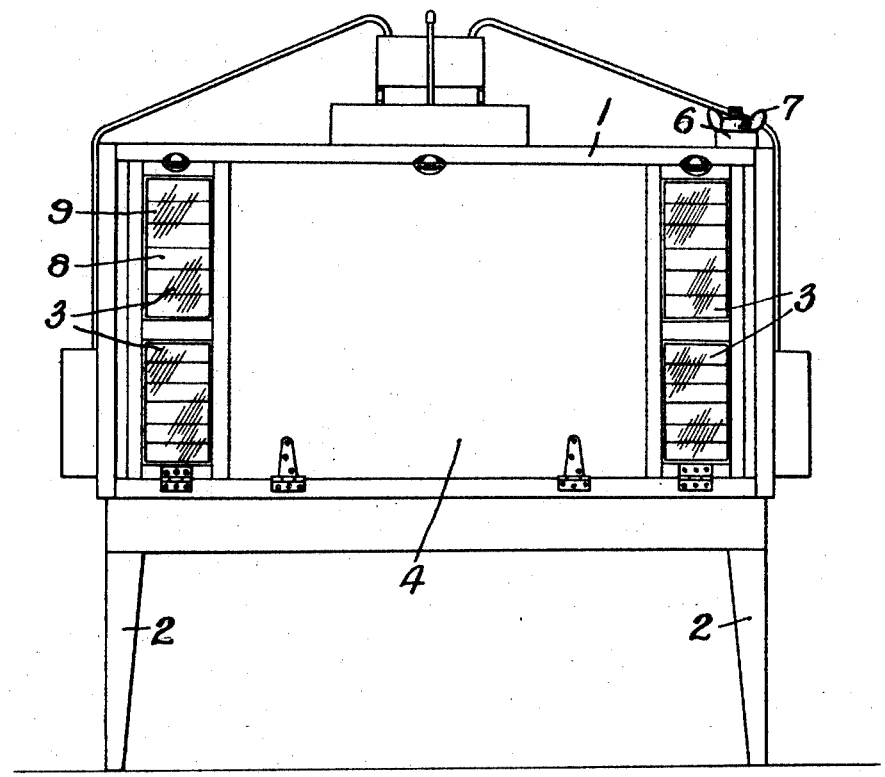
Figure 3 is a front elevation.
Figure 4:
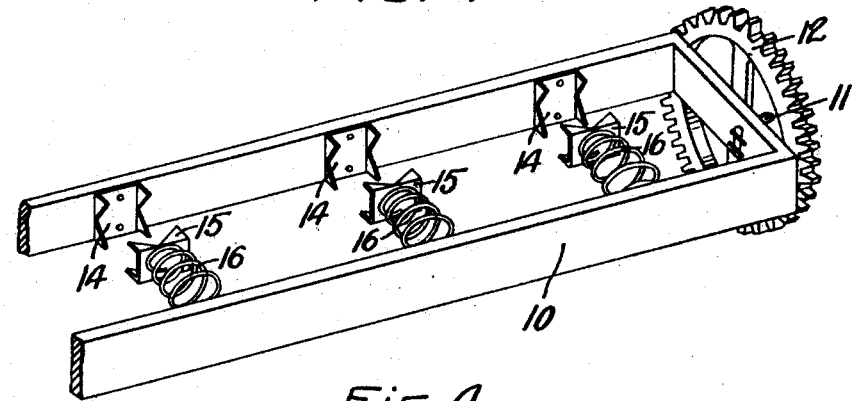
Figure 4 is an enlarged perspective view of a portion of one of the tilting members.

In the drawings, 1 is the incubator casing, usually mounted on the standard 2, and 3 are two narrow vertical windows provided on each side of the door 4. The door 4 is suitably hinged to the casing, and the vertical windows 3 are preferably hinged to the frame. Suitable means are provided to lock said door and windows.

Inside said casing 1, on one side thereof, is movably secured a vertical toothed rack 5 which preferably projects through the top of said casing, the upper projecting end 6 of said rack being threaded, to engage a nut 7 which normally rests against the casing 1. By screwing or unscrewing said nut, the rack 5 is operated up and down.

Intermediate of said casing 1, are horizontally disposed a plurality of superposed pairs of parallel partitions 8, which are slidable in the sides of said casing 1, said partitions being suitably distanced from one another. Between each pair of partitions is provided a frame 9, parallel to the said partitions and slidably movable in the sides of said casing 1, these frames having a plurality of longitudinally disposed narrow rectangular egg carriers 10, mounted on pivots or pins 11 engaged in the inner sides of said frames. A space is left between one end of each carrier and the adjacent side of frame 9, so as to provide sufficient room in which to mount a gear 12 mounted on each of said pins 11, said gears 12 intermeshing, so that if one gear is rotated, all of the gears 12, and naturally all of the carriers 10 will be actuated. One of said pins 11 projects through said frame 9, and on its outer end is mounted a gear 13 adapted to co-act with the toothed rack 5. When said rack 5 is operated by the nut 7, the gears 13 and 12 will be operated and carriers 10 tilted, to turn the eggs which are secured therein.

The eggs in the carriers 10 are held by means of fixed gripping jaws 14 which cooperate with movable gripping jaws 15 mounted on spiral springs 16. The jaws 14 are secured to one of the inner sides of the carriers 10, while the springs 16 and jaws 15 are secured to the other side of said carriers in alignment therewith.

What I claim as my invention is:—

1. In an incubator, the combination of a casing; a plurality of superposed frames slidably mounted therein; a plurality of egg carriers disposed in parallel, longitudinal relation in each frame with their opposite ends journaled in the adjacent side members of the frame; a gear fixed to one journal of each of the carriers in each frame at one side of the casing, all of the gears of the carriers in each frame intermeshing; a gear fixed to the gear-carrying journal of one carrier in each frame, all of the last-named gears being disposed in vertical alinement; a vertical rack movably mounted in the casing and meshing with all of the last-named gears so as to rotate them in unison and thereby rotate all of the carriers in all of the frames simultaneously; and means for operating said rack at will to variable extents and in either direction.

2. In an incubator, the combination of a casing; a plurality of superposed frames slidably mounted therein; a plurality of egg carriers disposed in parallel, longitudinal relation in each frame with their opposite ends journaled in the adjacent side members of the frame; a gear fixed to one journal of each of the carriers in each frame at one side of the casing, all of the gears of the carriers in each frame intermeshing; a gear fixed to the gear-carrying journal of one carrier in each frame, all of the last-named gears being disposed in vertical alinement; a vertical rack movably mounted in the casing and meshing with all of the last-named gears so as to rotate them in unison and thereby rotate all of the carriers in all of the frames simultaneously, said rack having a threaded upper portion which projects outwardly above the casing; and a nut engaged with said threaded portion for operating the rack at will to variable extents and in either direction.

3. In an incubator, the combination of a casing; a plurality of superposed frames mounted therein; a plurality of rocking egg carriers mounted in each frame in parallel relation and interconnected for movement in unison; a series of superposed gears, one for each frame, for rocking the carriers therein; a vertical rack movably mounted in the casing and meshing with all of said superposed gears so as to rotate them simultaneously and in the same direction and thereby rotate all of the carriers in all of the frames, said rack having a threaded upper portion which projects outwardly above the casing; and a nut engaged with said threaded portion for operating the rack at will to variable extents and in either direction.

Signed at Montreal, Quebec, Canada, this thirty-first day of July 1920.

ALPHONSE CLÉOPHAS THÉRIAULT.

Witnesses:
C. PATENAUDE,
G. BEAUDOIN.